Sept. 2, 1969   H. M. GALLAY ET AL   3,464,274

MECHANICAL, DOUBLE-INTEGRATING ACCELEROMETER

Filed Oct. 19, 1966   2 Sheets-Sheet 1

INVENTORS,
Harry M. Gallay
Albert F. Mainland
Mota Teumim
William Yarina

BY: *Harry M. Emegovity,*
*Edward J. Kelly* &
*Herbert Berl*

ATTORNEYS.

Sept. 2, 1969     H. M. GALLAY ET AL     3,464,274
MECHANICAL, DOUBLE-INTEGRATING ACCELEROMETER
Filed Oct. 19, 1966     2 Sheets-Sheet 2
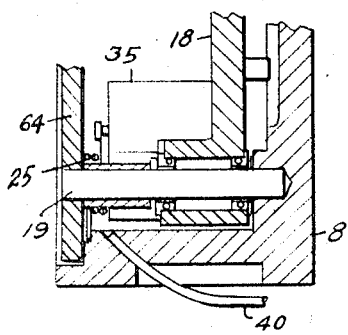
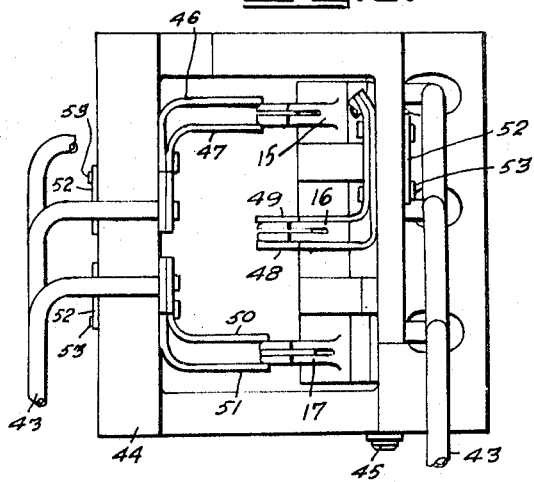
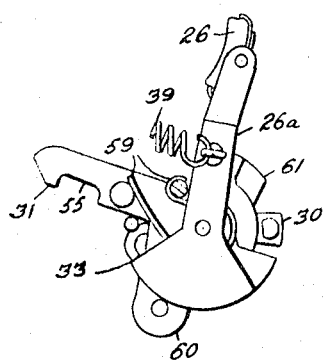
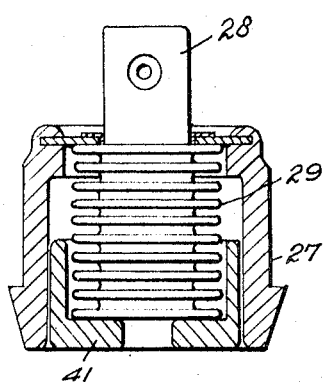
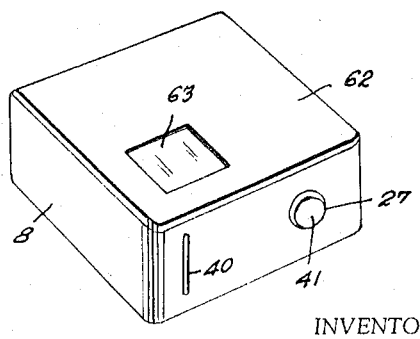
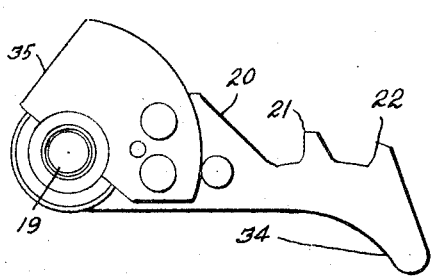
INVENTORS,
Harry M. Gallay
Albert F. Mainland
Mota Teumim
William Yarina
ATTORNEYS.

United States Patent Office 3,464,274
Patented Sept. 2, 1969

3,464,274
MECHANICAL, DOUBLE-INTEGRATING ACCELEROMETER
Harry M. Gallay, Orlando, Fla., and Albert F. Mainland, New York, Mota Teumim, Spring Valley, and William Yarina, Whitestone, N.Y., assignors, by mesne assignments, to the United States of America as represented by the Secretary of the Army
Filed Oct. 19, 1966, Ser. No. 588,674
Int. Cl. G01p 15/04
U.S. Cl. 73—490                     9 Claims

ABSTRACT OF THE DISCLOSURE

The accelerometer is carried on a larger vehicle, such as a rocket or missile. A flywheel is set into motion, via a stationary rack and suitable gearing, as a result of setback of a pendulum-like device. The speed of the flywheel is proportional to the vehicle velocity. The length of time required for the pendulum-like device to be set back a given distance is proportional to the elapsed time after the flywheel-pendulum was actuated. A switch, or switches, may be actuated as a result of the degree of pendulum setback, and a feedout from the switch or switches indicates the setback or vehicle travel. A brake may be used to decelerate the flywheel when it approaches its extreme position of setback.

---

The present invention relates to an accelerometer and particularly to an accelerometer capable of use in a rocket.

Although not limited thereto, the invention presented herein will often be described in its application to a missile.

The primary object of the present invention is to provide an accelerometer with a minimum of moving parts and a maximum reliability over a long range of operation.

Another object is to provide a compact accelerometer arrangement particularly designed for missiles which can function accurately over a spectrum of conditions to actuate sundry phases of missile flight.

The accelerometer embodied in the instant invention is predicated upon the travel of a motion-responsive mass within a housing. Vehicle acceleration is sensed directly as an inertia force by the freely mounted mass or $g$ weight. In the case of missiles, single integration of acceleration with respect to time indicates velocity, while double integration manifests the missile slant travel or acceleration.

The motion-responsive mass is free to move a very short distance inside its housing simultaneously with and in precise relation to vehicle travel. In doing so, it may operate suitably positioned switches or relate by electronic means the derived acceleration of the vehicle. The energy input from the vehicle to the device is the product of the mass times missile acceleration times travel increment of the mass within its housing. Such energy is much greater than that actually required to operate the accelerometer. And, removing and storing the excess energy is the basic requirement for producing a true mechanical double-integrating accelerometer. In the present invention this is accomplished by causing the mass to operate a pinion gear against a rack, ratioing up pinion rotation through a miniature gear box, and storing excess energy in a small, high-speed flywheel mounted on the gear box output shaft. Total missile travel and total flywheel revolutions are related quantities.

The constraint applied to the mass by the rack-pinion-gear train-flywheel system is such that when the device and the vehicle or missile on which it is mounted simultaneously experience the same acceleration-time history, the small travel of the mass inside the housing is directly proportional to the large travel of the vehicle if a straight rack is used, or mathematically related in the case of a curved rack. Given points along the path of travel of the host vehicle are "sensed" by the actuation of switches installed along the path followed by the mass during its corresponding travel within its housing.

As set forth above, ratioing of the large travel of the vehicle to the small travel of the mass is accomplished by storing in a flywheel the excess energy imparted to the motion-responsive mass: the total work done on the mass is equal to the accelerational force multiplied by the distance traveled by the mass within the housing. A small portion of the work is used for the translation of the mass while the remainder is stored as rotational kinetic energy. Rotational energy storage can be achieved by a rack, pinion, and conventional gear train, or by a helical worm-type unit whereby the mass translation is converted to rotational energy.

The accelerometer contains the following devices for auxiliary operations:

A "threshold" latch which prevents commencement of accelerometer double integration and subsequent switch operations until the missile attains an acceleration of 8 G's.

A "bias" latch which automatically operates in the event that missile acceleration falls below 8 G's during the first 3000 feet of slant range, thereby preventing the unit from closing the "arm" contacts, in the event of an aborted mission.

A "contact" or final latch which keeps the unit and its contacts in their transferred position after completion of a normal flight, or its simulation, until manually reset.

A manual reset mechanism which provides means to reset the unit to its initial positions. Reset operation automatically disengages the "contact" latch and brake.

A brake which is actuated towards the end of travel after all switches have been thrown, and eliminates impact or possible damage by converting flywheel kinetic energy into heat. Although intended to function only once in combat, the unit is capable of unlimited test operations.

Other objects and advantages of the present invention will become apparent from the following detailed description taken in conjunction with the drawings. It should be understood, however, that such detailed description is offered only by way of illustration and explanation and not by way of limitation. Various changes may be made by those skilled inthe art without departing from the scope and spirit of the invention. In the drawings:

FIGURE 5 is a sectional view taken along line 5—5 of FIGURE 1;

FIGURE 6 is an enlarged plan view looking along line 6—6 of FIGURE 1 in the direction of the arrows;

FIGURE 7 is a view showing the position of the cranks as assembled on the step shaft with the plate reset assembly removed for clarity;

FIGURE 8 is a view of the latch assembly hidden in FIGURE 1 by the brass $g$ arm;

FIGURE 9 is an enlarged sectional view of the reset button taken through line 9—9 of FIGURE 3; and FIGURE 10 is a perspective view of the present device illustrating its approximate size.

Figure 1:
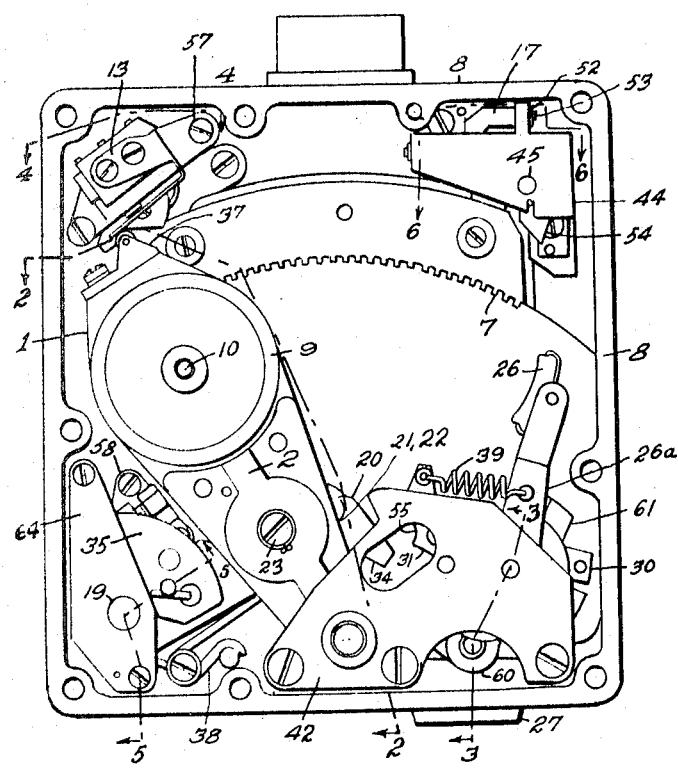
FIGURE 1 is a top view of the device of the instant invention with its cover removed.
Figure 2:
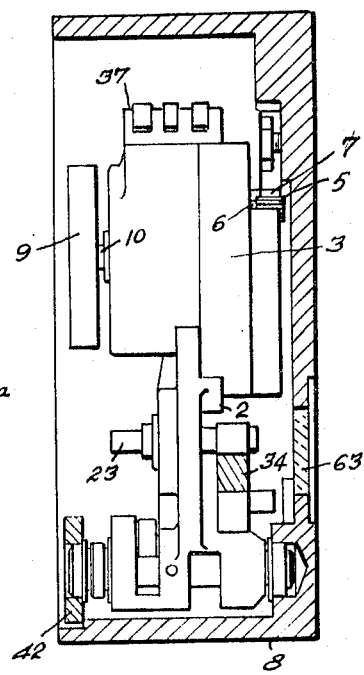
FIGURE 2 is a sectional view taken along line 2—2 of FIGURE 1.
Figure 3:
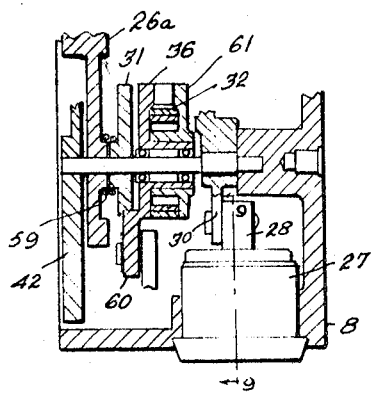
FIGURE 3 is a sectional view taken along line 3—3 of FIGURE 1.
Figure 4:
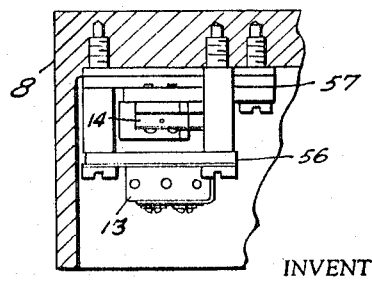
FIGURE 4 is a sectional view taken along line 4—4 of FIGURE 1.

The device is mounted on a missile. Missile acceleration acts along a line vector, but the mass of the instant invention moves along a circular arc whose chord represents acceleration. This permits the use of a pivoted g arm, and eliminates most of the friction inherent in designs with sliding components. Nevertheless, parametric precision is maintained by mathematically accounting for the effect of arc travel in the design calculations. The g arm mass 1 consists of a pivoted brass arm 2, which supports a brass housing 3 containing a precision miniature gear train (not shown). A pinion 5 is integral with the input shaft 6 actuating the gear train and mated to a circular arc rack 7 mounted along the top of the accelerometer housing 8. A flywheel 9 is carried by the output shaft 10 driven by the gear train to store excess energy. The gear train in housing 3 has a step-up ratio of 89.91 to 1, and one inch of travel along the rack 7 corresponds to 173.6 revolutions of the flywheel 9. The motion-responsive mass travel and the total flywheel revolutions are an exact function of missile travel and are almost proportional.

Acceleration of the vehicle results in proportionate movement of the housing 8 of the present device and the rack 7 carried by that housing. The g arm 1, on the other hand, tends to remain at rest, resulting in relative movement along rack 7. Such movement causes the actuation of the gear train within its case 3 by the teeth on rack 7. The gear train, in turn, rotates the flywheel which translates the movement of the g arm 1 along rack 7 into rotational energy. Also carried by the g arm above the gear housing 3 is a set of rollers 37 for the actuation of switches located on the path of travel.

Switches 13, 14, 15, 16 and 17 are mounted along the top of the housing in predetermined positions. Switch 13, mounted on its assembly 56, is a subminiature microswitch with an actuator leaf. Switch 4, carried by assembly 57, is a specially designed knife switch. Both these switches are located near the beginning of travel (see FIGURE 1). Near the end of travel, switches 15, 16 and 17, contained in a gang switch asembly 44, are a knife-switch group. The assembly is secured on housing 8 by snap ring 45. The gang switch housing 44 contains a rotor assembly 54, and inner and outer contact blades for each of the three switches. (See FIGURE 6. Blades 46, 48 and 51 are the outer contacts for switches 15, 16 and 17 respectively. Blades 47, 49 and 50 are the inner contacts for switches 15, 16 and 17 respectively. Each switch has a rivet backing plate 52 mounted on switch housing 44 and two rivet contact blades 53 secured thereto.) Exact adjustment of switch location and operation may be obtained by means of an oversize of slotted mounting holes. The wire leads 43 for all switches run to externally disposed functional instruments.

"Threshold" and "bias" latching are accomplished by a single unit 18 mounted in the corner of the housing diagonally opposite the end of the rack representing the end of travel on a steel stud 19, supported at one end by plate 64 and at the opposite end by the housing 8. A pivoted steel latch 20 with a hook portion 34 incorporates two machined detents 21, 22, either of which can engage a pin 23 on the g arm 1 when the latch 18 is in the "up" position thereby restraining the g arm against stop assembly 58. A brass counterweight 35 is attached to the latch assembly 18, and the assembly bears against a preloaded torsion spring 25. While the vehicle is moving from rest to an acceleration of 8 G's, for example, the torsion spring 25 overcomes the inertia force of the latch assembly 18 and keeps the assembly 18 in its "up" position; securely restraining the g arm pin 23 in the first or "threshold" detent 21. When 8 G's acceleration is attained, a force in the g arm 1 is generated simultaneously with a moment in the latch 20 sufficient to rotate it against the torsion spring 25 and cause the first or "theshold" detent 21 to roll away from the g arm pin 23 and release it. If missile acceleration should drop below 8 G's after a successful launch, the spring 38 will overcome the inertia moment of latch 18 and roll the second or "bias" detent 22 into position to trap the g arm pin 23 and prevent arming.

Final latching can only occur after full g arm travel, which corresponds to a successful launch and properly functioning flight of at least 3000 feet. The final latching means consist of a pivoted arm 31 biased by spring 32 and incorporating a detent 55 which traps the pin 23 on the g arm after all switches have been transferred. Energy stored in the flywheel 9 assures the foregoing operation.

A spring-loaded friction brake 26 mounted on a brake arm assembly 26a rubs against the rotating steel flywheel 9 at the end of travel to convert kinetic energy into heat of friction, thereby bringing the g arm gently to rest in the latched position with the aid of spring brake 39 anchored to the plate reset assembly 42, thereby permitting an unlimited number of operational cycles without damage to the device. Brake 26 may consist of Synthane. See Zimmerman and Lavine, Handbook of Material Trade Names 553 (1953).

A hermetically sealed reset mechanism 27 is built into the device to simultaneously disengage the final latch 31 move the brake 26 away and store energy to gradually return the g arm 1 to its initial or "threshold" position of latch 20. A push-rod 28, brazed to a metallic bellows 29 which acts as a seal and return spring, disengages the final latch 31 and brake 26 and rotates a crank 30 which is bottomed against a second crank 60 without mechanical attachment when the g arm is in final position. Full travel of the push-rod 28 loads a circular leaf spring 32 mounted in retainer 61, which gradually unwinds by rotating another crank 33 linked to the latch arm 31 to release g arm 1 and permit it to return to its initial position when the push-rod 28 is held in. Releasing the button 41 after resetting leaves the device ready for normal accelerometer operation. During operation and after final latching, arm 31 is held in position by spring 59 (see FIGURE 7).

The assembly is designed to be completely operational inside its cast aluminum housing. The cover 62 may be removed to provide ease of testing and of adjustment. Prior to operation, however, the cover is hermetically sealed in place, and the unit through tube 40, evacuated and filled with helium; providing an inert, noncorrosive environment. A transparent window 63 may be incorporated in the housing which permits visual operation of the "threshold" latch for assurance that the unit is properly set for launching.

While only one preferred form of the invention is shown and described, other forms of the invention are contemplated and numerous changes and modifications may be made therein without departing from the spirit of the invention as set forth in the appended claims.

What is claimed is:

1. An instrument for doubly integrating acceleration of a vehicle comprising, in combination, a housing, a rack carried by said housing, a pendulum-like motion responsive mass pivoted to the housing and slidably mounted on said rack, latching means mounted on said housing to restrain movement of said mass under predetermination conditions, a flywheel rotatably carried by said mass and operatively connected to said rack so that travel of said mass along said rack due to acceleration of the vehicle causes said flywheel to rotate, braking means mounted on said housing at the end of said rack to retard the travel of said mass by engaging said flywheel and converting mechanical energy to heat, resetting means mounted on said housing and in contact with said mass to return it to its initial position, and at least one switch intermediate the ends of said rack and in circuit with externally disposed functional instruments, whereby when said mass contacts said switch on its travel, said circuit is closed.

2. The combination set forth in claim 1, wherein said rack is a circular arc.

3. The combination set forth in claim 2, wherein said motion responsive mass consists of an arm pivotally mounted at one end with a pin on said housing and slidable at the other end on said rack.

4. The combination set forth in claim 3, wherein said latching means consists of a pivotable arm mounted on said housing and having two machined detents incorporated thereon, whereby said detents can engage said pin, a counterweight mounted on said pivotable arm, and a preloaded torsion spring against which bears said pivotable arm, whereby initial motion up to a predetermined acceleration creating inertia force in the motion responsive mass will be overcome by said torsion spring thereby keeping said pivotable arm in a position restraining said arm pin in one of said detents, until upon attainment of a predetermined acceleration the force in said mass plus the moment generated in said pivotable arm tending to rotate it against the torsion spring are sufficient to cause the restraining detent to release the metal arm pin and its mass.

5. The combination set forth in claim 3, wherein said resetting means consists of a push rod, a metallic bellows secured to said push rod, a crank rotatable by said bellows, a second crank bottomed against said first crank when said arm is in its terminal position, a circular leaf spring adjacent to and loadable by said push rod, and a third crank rotatable by said leaf spring and linked to said arm, whereby actuation of said push rod depresses the bellows rotating the first crank, releases the second crank, loads the leaf spring which rotates a third crank attached to the arm thereby returning the arm to its initial position ready for use.

6. The combination set forth in claim 1, wherein said housing has a removable cover.

7. The combination set forth in claim 1, wherein said braking means consists of a spring-loaded friction brake mounted on said housing, whereby the brake will contact the flywheel at a point commensurate with the end of travel of said mass, thereby converting the kinetic energy of the moving mass into heat of friction and bringing the flywheel and the mass to rest.

8. The combination set forth in claim 1, wherein said switches consist of one subminiature microswitch with an actutaor leaf and one knife switch located near the beginning of travel of said mass, and one knife switch group assembly consisting of three separate switches located near the end of travel of said mass, whereby said mass in the course of its travel activates each switch at a point corresponding to a predetermined point along the path of travel of the vehicle.

9. The combination set forth in claim 1, and noncorrosive gas in said housing.

References Cited
UNITED STATES PATENTS

| | | | |
|---|---|---|---|
| 3,122,023 | 2/1964 | Gledhill | 73—503 |
| 3,167,962 | 2/1965 | Scotto | 73—515 |
| 3,197,587 | 7/1965 | Pope | 73—505 |
| 3,226,503 | 12/1965 | Bracutt | 73—503 |

JAMES J. GILL, Primary Examiner

HERBERT GOLDSTEIN, Assistant Examiner

U.S. Cl. X.R.

73—503; 200—61.45, 61.5